(12) United States Patent
Tamegai et al.

(10) Patent No.: US 8,181,968 B2
(45) Date of Patent: May 22, 2012

(54) PISTON RING

(75) Inventors: Etuo Tamegai, Saitama (JP); Hiromi Ishikawa, Saitama (JP); Tomotaka Kariya, Saitama (JP); Makoto Tsuruta, Yokohama (JP)

(73) Assignees: Nippon Piston Ring Co., Ltd., Saitama (JP); STT Inc., Tokyo (JP)

( * ) Notice: Subject to any disclaimer, the term of this patent is extended or adjusted under 35 U.S.C. 154(b) by 416 days.

(21) Appl. No.: 12/196,317

(22) Filed: Aug. 22, 2008

(65) Prior Publication Data

US 2009/0051122 A1 Feb. 26, 2009

(30) Foreign Application Priority Data

Aug. 24, 2007 (JP) .................. P2007-218665

(51) Int. Cl.
*F16J 9/26* (2006.01)
(52) U.S. Cl. .................................................. 277/440
(58) Field of Classification Search .......... 277/442–444, 277/440, 456
See application file for complete search history.

(56) References Cited

U.S. PATENT DOCUMENTS

| | | | | |
|---|---|---|---|---|
| 4,703,076 A * | 10/1987 | Mori | ............................... | 524/420 |
| 5,469,777 A | 11/1995 | Rao et al. | | |
| 5,531,195 A * | 7/1996 | Onoda et al. | .................. | 277/442 |
| 6,983,681 B2 * | 1/2006 | Iwata et al. | ..................... | 92/12.2 |
| 2005/0269787 A1 * | 12/2005 | Muramatsu et al. | .......... | 277/434 |
| 2008/0127819 A1 | 6/2008 | Maier | | |

FOREIGN PATENT DOCUMENTS

| | | |
|---|---|---|
| DE | 19524367 | 2/1996 |
| DE | 19646524 | 7/1997 |
| DE | 102004057560 | 6/2006 |
| JP | 7-63266 | 3/1995 |
| JP | 9184079 | 7/1997 |
| JP | 1159511 | 9/1997 |
| JP | 10-246149 | 9/1998 |
| JP | 11-246823 | 9/1999 |

OTHER PUBLICATIONS

German Office Action in corresponding German Application No. 102008038635.9 dated Nov. 9, 2011 with English translation of German Office Action.

* cited by examiner

*Primary Examiner* — Vishal Patel

(74) *Attorney, Agent, or Firm* — Young & Thompson

(57) ABSTRACT

A piston ring includes a piston ring body and a surface coating film formed on at least one of upper and lower surfaces of the piston ring body. The surface coating film comprises a heat-resistant resin and a metal powder contained in the heat-resistant resin, and a phosphate coating film is formed, as base coating film of the surface coating film, on a surface on which the surface coating film of the piston ring body is formed.

4 Claims, 8 Drawing Sheets

PISTON RING

BACKGROUND OF THE INVENTION

1. Field of the Invention

The present invention relates to a piston ring utilized for an internal combustion engine, and more particularly, relates to a piston ring capable of effectively preventing adhesion (deposition) of aluminum to a piston ring.

2. Related Art

Generally, a compression ring and an oil ring are mounted as set of a piston ring to a piston that performs reciprocating motion. The compression ring has a function of preventing a blow-by phenomenon in which highly pressurized combustion gas is blown out from a combustion chamber side to a crank chamber side. On the other hand, the oil ring is used for mainly achieving a function of suppressing an oil-up phenomenon in which an excessive lubricant adhering on a cylinder inner wall surface invades into the combustion chamber side from the crank chamber side and then is consumed. In a conventional standard combination of the piston ring, there is well known a combination of three rings comprising two compression ring including a one top ring and a second ring and one oil ring.

In recent, according to an increasing tendency of light weight and high outputting of an internal combustion engine, it has been highly required for a piston ring to have a highly improved quality. In a conventional technology for improving durability of the piston ring of the internal combustion engine, wear resistance surface treatment such as nitriding treatment, ion plating treatment, or hard chromium plating treatment has been proposed.

In these surface treatments, the nitriding treatment has been highly evaluated and widely used as surface treatment for the piston ring, which is utilized under harsh operating conditions, because the nitriding treatment provides an excellent wear resistance performance.

However, although the piston ring effected with the nitriding treatment is excellent in the wear resistance, when it is applied to a piston made of an aluminum alloy, wear of a ring groove of the piston tends to be increased. In addition, as shown in FIGS. 1A to 1C, a phenomenon of adhering aluminum to a lower surface 3 of a piston ring 1 from a lower surface of a groove of a piston made of aluminum alloy has been caused (see FIG. 1C).

FIG. 2A to 2C are charts showing change of surface conditions of upper and lower surfaces 2 and 3 of the ring groove of the piston carried out by using a contact stylus surface-roughness testing machine. As shown in FIG. 2, the surface conditions of the upper and lower surfaces 2 and 3 of the piston ring groove changes from a normal condition shown in FIG. 2A to an aluminum adhesion condition shown in FIG. 2C through a piston groove rough condition 2B.

In FIGS. 2A to 2C, the axis of abscissa represents a position of the piston and the axis of ordinate represents waviness of the piston groove, and in these figures, letter F denotes a front direction, AT denotes anti-thrust direction, R denotes rear direction and T denotes thrust direction.

Furthermore, FIGS. 3A to 3C show aluminum adhesion mechanism, in which FIG. 3A shows a state that the lower surface 3 of the piston ring 1 and a groove lower surface 11 of an aluminum alloy piston 10 contact each other through oxide films 8, each having thickness of less than 0.2 µm, formed on both the surfaces, FIG. 3B shows a state that a stress of the contacting oxide films 8 becomes locally high, which destroys the oxide films 8, and Fe on the lower surface 3 of the piston ring 1 and Al on the groove lower surface 11 of the aluminum alloy piston 10 are joined, and FIG. 3C shows a state that an aluminum alloy 20 is fused to the lower surface 3 of the piston ring 1.

Further, FIG. 4 shows an enlarged view of the aluminum adhering portion, and in FIG. 4, reference numeral 20 denotes the adhering aluminum and reference numeral 21 denotes a joined portion of the Al and Fe.

As mentioned above, according to vertical motion of the piston ring, when local wear resulted from this welding phenomenon occurs to a predetermined portion of the piston groove, sealing performance of the internal combustion engine is degraded by the blow-by of a blow-by gas, and hence, an output is reduced. This phenomenon occurs for a short time on the lower side of the piston ring groove and largely affects on the durability of the internal combustion engine. Accordingly, there have been conventionally proposed countermeasures to wear of the piston groove.

For example, as the countermeasure to the wear of the piston groove, in order to prevent the piston and the piston ring from directly contacting each other, the piston is subjected to anode oxidation film coating treatment, plating treatment or matrix strengthening treatment in the piston, and on the other hand, the piston ring is subjected to phosphor salt film coating treatment or plating treatment, or as shown in FIGS. 5A and 5B, resin coating treatment is applied to the surfaces of the piston 10 and piston ring 1 (for example, Defric (made by KAWAMURA KENKYU-SHO) coating treatment.

Furthermore, in order to solve the above problem, there has been developed and provided a piston ring in which an wear resistance treated layer such as nitride layer or chromium plating layer is formed to the upper and lower surfaces, or only lower surface of the piston ring, and a polybenzoimidazol resin film containing solid lubricant is formed on a surface of the wear resistance treated layer (see Patent Publication 1: Japanese Patent Application Laid-open Publication No. HEI 7-063266)

Moreover, there have also been developed and provided, by persons other than the applicant of the subject application, a piston ring having a surface which is coated with an heat-resistant resin containing a solid lubricant (see Patent Publications 2 and 3: Japanese Patent Application Laid-open Publication Nos. HEI 10-246149 and HEI 11-246823)

However, the above-mentioned countermeasures to the wear of the piston groove in the conventional technology may be effective for preventing adhesion of aluminum in an initial stage of the using of the piston, but are insufficient for a long term use of the piston, thus requiring improvement of durability.

More specifically, for example, although the above Patent Publication 1 discloses a surface coating film composed of polybenzoimidazol resin and solid lubricant (graphite or $MOS_2$). The polybenzoimidazol resin is liable to be oxidized in its liquid resin at the formation of the coating film and is deteriorated with age. Thus, it is necessary to pay attention to use. In addition, the polybenzoimidazol is sometime difficult to stably maintain its quality for a long time.

Furthermore, the above Patent Publication 2 discloses a surface coating film composed of polyamideimide resin or polyimide resin and a solid lubricant (graphite, $MOS_2$, $WS_2$ or polytetrafluoroetylene). However, such surface coating film does not sufficiently prevent an aluminum adhesion and also involves cost increasing problem.

Still furthermore, the above Patent Publication 3 discloses a surface coating film composed of polyamideimide resin or polyimide resin and a solid lubricant such as $MoS_2$ or $Sb_2O_3$. However, such coating film cannot sufficiently prevent the adhesion of aluminum, and Sb$_2$O$_3$ is harmful for environment, thus being difficult to use.

SUMMARY OF THE INVENTION

In a conventional technology of preventing wear of a piston ring groove, a surface coating film containing a solid lubricant is applied to the piston ring surface so as to endow the surface lubricity to the surface of the piston ring body. On the contrary, in the present invention, the surface coating film contains the metal powder rather than the solid lubricant.

As mentioned, in the conventional technology, it was aimed to improve the lubricating ability (lubricity) of the piston ring surface to make reduce the wear of the piston ring groove. This aim may be achieved by endowing the piston ring surface with the lubricity.

However, in such measure, there may be no problem at the initial stage at which the surface coating film having lubricating ability sufficiently exists, but after long time passes, the surface coating film itself may be worn and peeled off, resulting in loss of lubricating ability, and the piston ring body surface may be exposed and the piston ring groove may be worn.

The present invention was conceived in consideration of the circumstances mentioned above and an object thereof is to provide a piston ring capable of improving wear resistance property, effectively preventing aluminium adhesion phenomenon to a piston ring and effectively preventing peeling of a surface coating film from a piston ring body.

The above and other objects can be achieved according to the present invention by providing a piston ring including a piston ring body and a surface coating film formed on at least one of upper and lower surfaces of the piston ring body, wherein the surface coating film comprises a heat-resistant resin and a metal powder contained in the heat-resistant resin, and a phosphate coating film is formed, as base coating film of the surface coating film, on a surface on which the surface coating film of the piston ring body is formed.

In preferred embodiments, it may be desired that the phosphate coating film is a coating film of a material selected from a group consisting of tribasic zinc phosphate system, phosphoric acid manganese system, and tribasic zinc phosphate calcium system.

It may be desired that the phosphate coating film has a thickness of 1 to 10 µm and that the phosphate coating film has a surface roughness of 1 to 10 µm in ten-point average roughness Rz based on JIS B 0601 (1994).

The metal powder may be either one of pure copper, copper oxide or copper alloy, and containing rate of the metal powder with respect to the entire surface coating film is in a range of 20 to 80 mass %. The heat-resistant resin may include a solid lubricant having containing rate of 2 to 10 mass % with respect to the entire surface coating film, and the solid lubricant may be one or more than one of molybdenum disulfide, tungsten disulfide or graphite.

It may be also desired that the heat-resistant resin is polyamideimide resin or polyimide resin.

According to the present invention of the characters mentioned above, since the surface coating film composed of the heat-resistant resin and the metal powder contained in the heat-resistant resin on at least one of the upper and lower surfaces of the piston ring body, it is possible to prevent a portion of the piston ring groove formed of aluminum alloy from peeling off and adhering to the piston ring, and in addition, since the phosphate coating film as base coating film is formed on the surface on which the surface coating film of the piston ring body is formed, the surface coating film can be firmly tight to the piston ring body through the phosphate coating film, and as a result, the peeling off of the surface coating film from the piston ring body can be effectively prevented.

Furthermore, according to the present invention, since the lubricity can be applied to the surface of the piston ring by the heat-resistant resin constituting the surface coating film, and in addition, the surface coating film formed on the piston ring can be also endowed with the wear resistance property by the metal powders. By forming the phosphate coating film as the base coating film on the surface on which the surface coating film of the piston ring body is formed, the surface coating film can be prevented from peeling off from the piston ring, so that the lubricity due to the heat-resistant resin can be maintained for a long time.

The nature and further characteristic features of the present invention will be made clearer from the following descriptions made with reference to the accompanying drawings.

BRIEF DESCRIPTION OF THE DRAWINGS

In the accompanying drawings:

FIG. 1 includes views showing aluminium adhesion phenomenon, in which

DESCRIPTION OF THE PREFERRED EMBODIMENT

An embodiment of a piston ring according to the present invention will be described hereunder with reference to the accompanying drawings of FIGS. 6 and 7

Figure 1A:
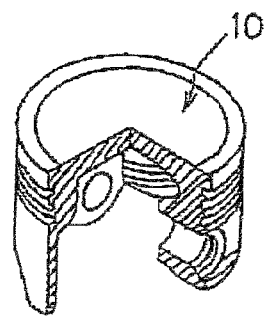
FIG. 1A is a perspective view, partially cut away, of a piston.
Figure 1B:
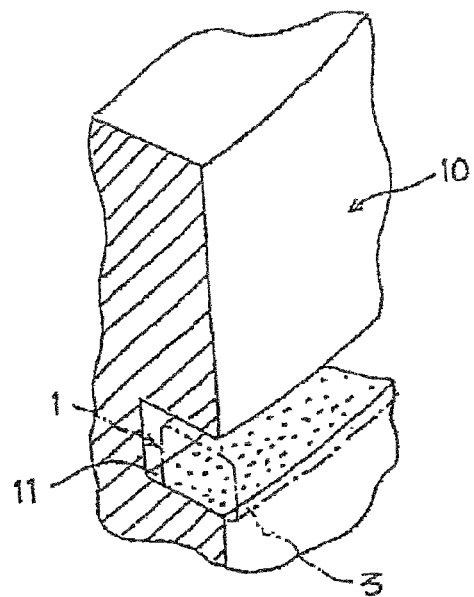
FIG. 1B is an enlarged perspective view partially showing a piston ring and piston ring groove.
Figure 1C:
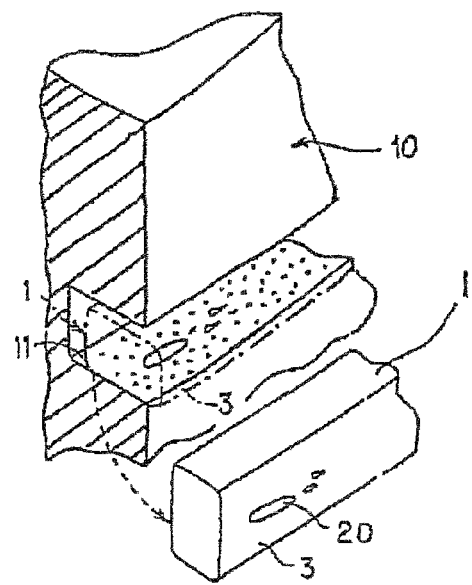
FIG. 1C is an enlarged perspective view partially showing an aluminium adhesion to the piston ring.
Figure 2A:
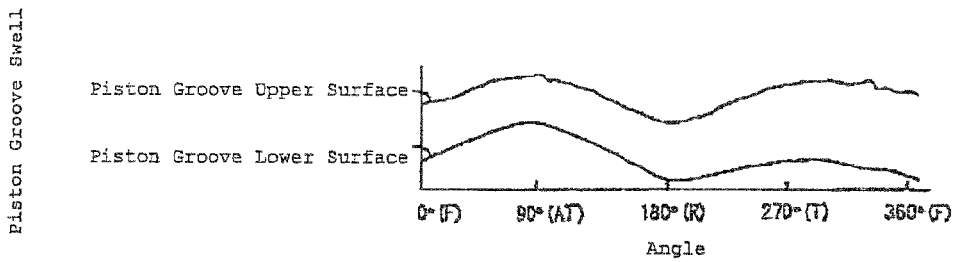
FIG. 2 includes FIGS. 2A, 2B and 2C, which shows changes in surface conditions of upper and lower surfaces of the piston ring groove.
Figure 2B:
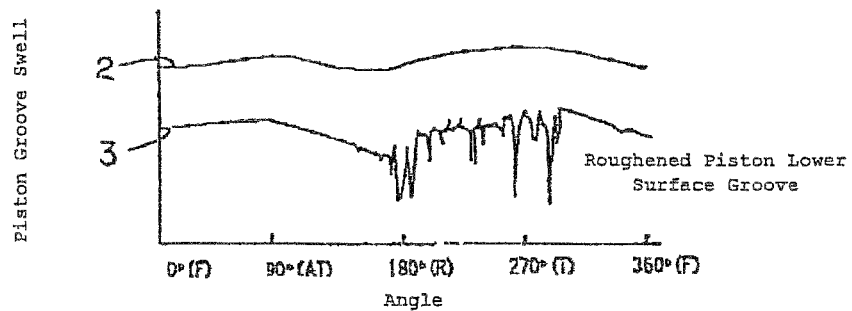
Figure 2C:
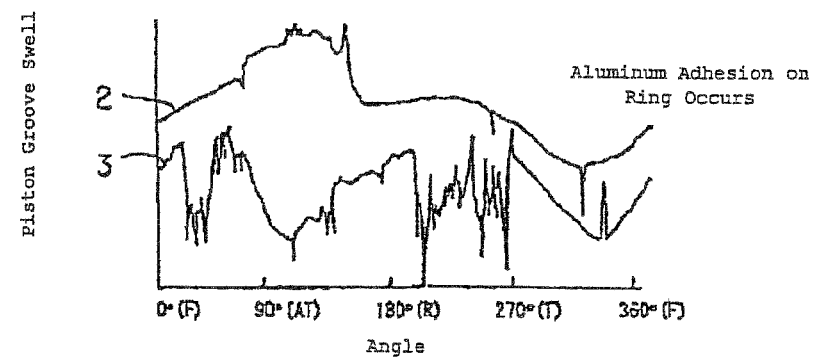
Figure 3A:
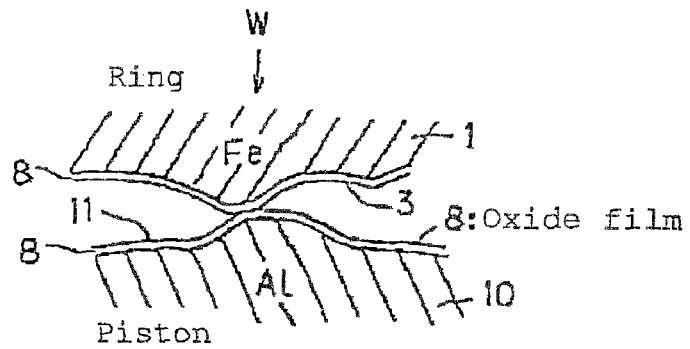
FIG. 3 includes FIGS. 3A, 3B and 3C illustrating sectional views showing aluminium adhesion mechanism.
Figure 3B:
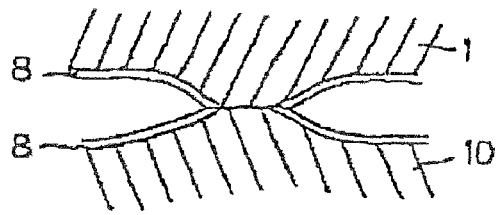
Figure 3C:
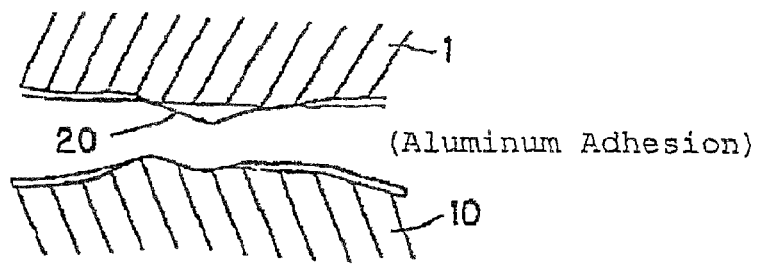
Figure 4:
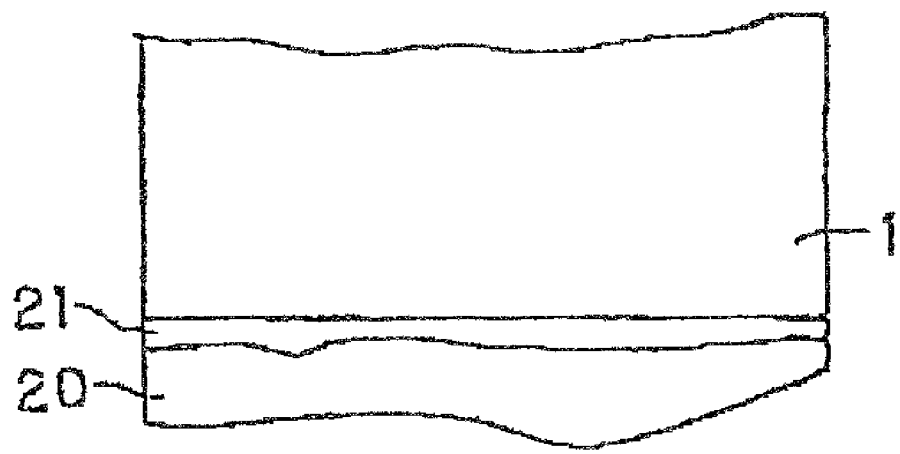
FIG. 4 is an enlarged view showing adhesion part of aluminium.
Figure 5A:
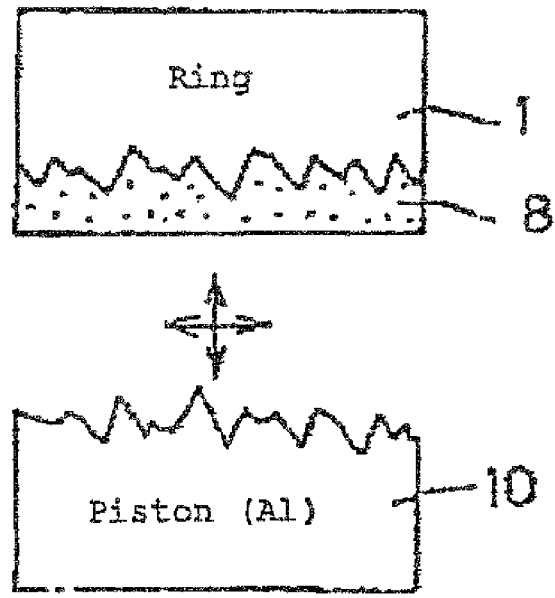
FIG. 5 includes FIGS. 5A and 5B illustrating a conventional resin coating treatment.
Figure 5B:
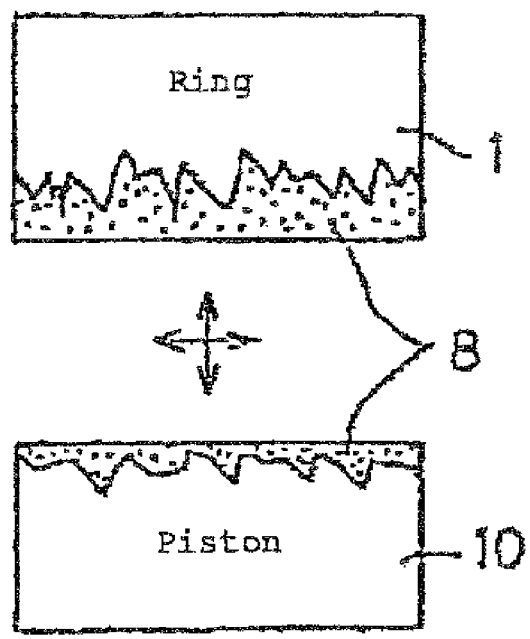
Figure 6:
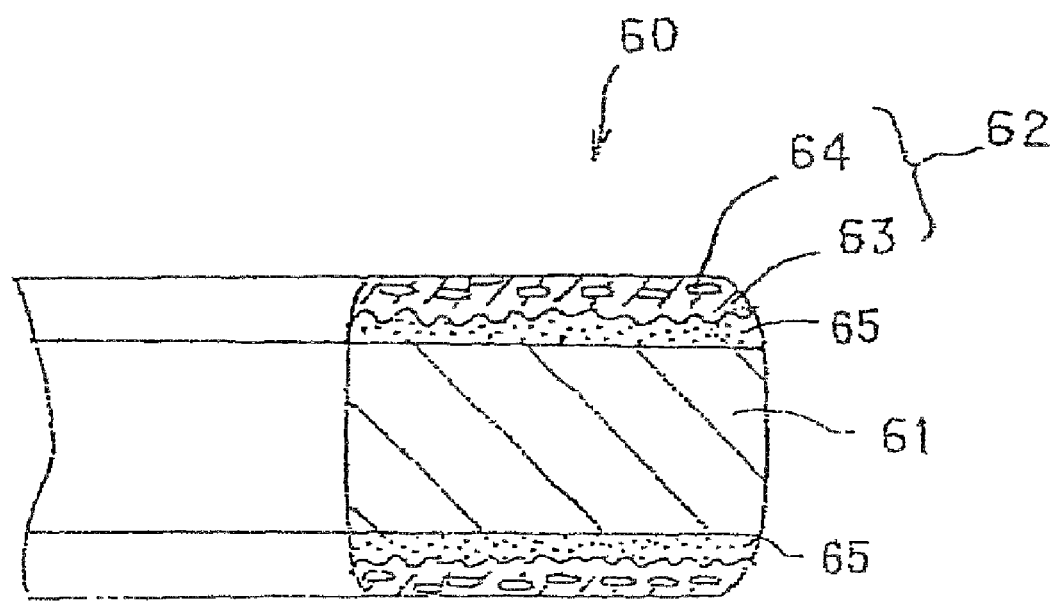
FIG. 6 is a sectional view showing a piston ring according to one embodiment of the present invention.

With reference to FIG. 6, a piston ring 60 of the present embodiment is provided with a piston ring body 61 and a surface coating film 62 formed on at least one of upper and lower surfaces of the piston ring body 61 (both surfaces in FIG. 6). Further, a phosphate film 65 is formed, as a base (coating) film, on a surface of the piston ring body to which the surface coating film 62 is formed.

The piston ring body 61 of the present invention is not specifically limited in its material and every material may be usable. For example, steel (steel material) may be preferably utilized, and as a stainless steel, SUS440, SUS410, SUS304 or like, or 8Cr steel, 10Cr steel, SWOSC-V, or SWRH material may be utilized. The piston ring may be utilized as a top ring functioning as a so-called pressure ring as well as second ring, and moreover, according to the present invention, the piston ring may be applicable to an oil ring.

As shown in FIGS. 6 and 7, a surface coating film composed of a heat-resistant resin 63 and a metal powder (metal powder particles) 64 contained in the heat-resistant resin 63 is formed on the surface of the piston ring body 61, and a phosphate coating film 65 as base coating film is formed on the surface of the piston ring body 61 on which the surface coating film is formed.

The phosphate coating film 65 is formed for the purpose of preventing the surface coating film from peeling off from the piston ring body. The phosphate coating film 65 is formed, on the surface of the piston ring body 61 on which the surface coating film 62 is formed by chemical conversion treatment as basic treatment using phosphate. According to the formation of the phosphate coating film 65, the surface coating film 62 can be prevented from peeling off from the piston ring body 61.

The type or material of the phosphate for forming the phosphate coating film 65 is not limited to specific one as far as it achieves the above-mentioned function, but it may be desired that the phosphate can be easily produced with cheap cost and easily managed in handling. In view of these facts, it may be desired to use tribasic zinc phosphate system, phosphoric acid manganese system or tribasic zinc phosphate calcium system as such phosphate.

Furthermore, although thickness of the phosphate coating film 65 is not specifically limited in the present invention, it may be preferred for the phosphate coating film 65 to have thickness of 1 to 10 μm, and more preferably, 2 to 3 μm. In the case of the thickness of more than 10 μm, the phosphate coating film 65 becomes brittle and the tight force between the surface coating film 62 and the piston ring body 61 may be lowered. On the other hand, in the case of the thickness of less than 1 μm, aluminium adhesion is likely caused between the piston and the piston ring body 61 after the surface coating film 62 vanishes.

Figure 7A:
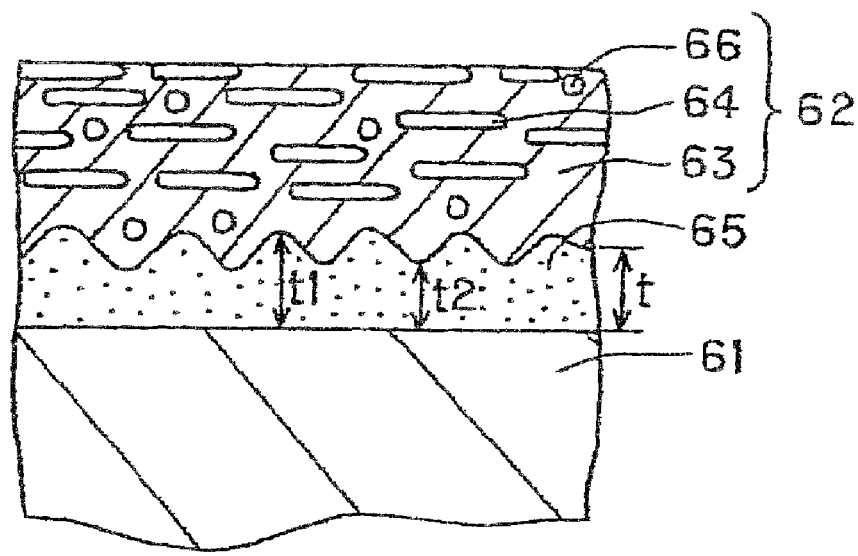
FIG. 7 includes FIG. 7A showing an enlarged sectional view of a portion near the surface coating film of the piston ring shown in FIG. 6 and also includes FIG. 7B showing an enlarged front view of an upper surface of the piston ring shown in FIG. 6.

Further, the film thickness of the phosphate coating film 65 in the present invention means an average film thickness "t" of the phosphate coating films 65 represented by "t1" and "t2" in FIG. 7A.

Although surface roughness of the phosphate coating film 65 is not specifically limited in the present invention, it is preferable that the phosphate coating film 65 has the surface roughness of 1 to 10 μm, and more preferably, 2 to 3 μm. In the case of the surface roughness of more than 10 μm, activation of the phosphate coating film 65 progresses, hence, the resin embossing impression occurs on the surface of the phosphate coating film 65, and accordingly, the phosphate coating film 65 may be hardly uniformly formed and the tight performance of the coating film itself may be degraded. Moreover, the surface coating film 62 is formed on such phosphate coating film 65 as formed with such surface roughness, the surface further becomes rough, which may result in increasing of initial blow-by gas or aggravation of attack to a piston ring groove of a piston ring. On the other hand, in the case of the surface roughness of less than 1 μm, the tight performance between the piston ring body 61 and the surface coating film 62 may be lowered.

Further, the surface roughness in the present invention means the ten-point average surface roughness Rz prescribed by JIS B 0601 (1994).

The heat-resistant resin 63 is applied for the purpose of imparting the lubricity (lubricating ability) mainly to the surface of the piston ring, and on the other hand, the metal powder is applied for the purpose of wear resistance property to the surface coating film 62 to which the metal powder is contained to thereby keep the lubricity by the heat-resistant resin for a long time.

As the heat-resistant resin 63 constituting the surface coating film 62 of the present invention is not limited to any material as far as it withstands an environmental atmosphere (temperature) in which the piston ring is used, has lubricity and holds and fixes the metal powder. More specifically, polyamideimide (PAI) resin or polyimide (PI) resin may be provided as such heat-resistant resin.

On the other hand, the metal powder 64 forming the surface coating film 62 is provided for the purpose of imparting the wear resistance property to the surface coating film 62 containing such metal powder 64. The metal powder 64 is not limited in its substance as far as it achieves the above purpose, and conventionally known metal may be optionally selectively used. For example, as such metal powder, there may be listed up various copper system powder such as pure copper powder, copper oxide powder, and other copper alloy such as yellow brass alloy. However, in the present invention, although the metal powder has the purpose of preventing the wearing of the heat-resistant resin, it is necessary to avoid attacking to the piston ring groove which is opposite material, and in this viewpoint, it may not be desired for the metal powder to have relatively high hardness, and thus, pure copper or copper oxide may be preferred.

Figure 7B:
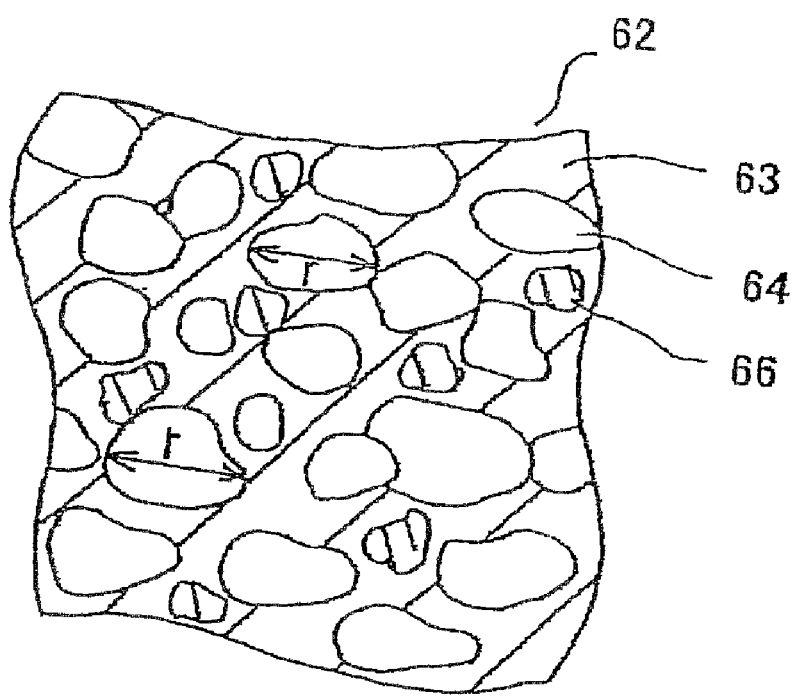

Such metal powder 64 is also not limited in its shape, and there may be adopted a stable shape such as spherical shape or polygonal shape, or indeterminate shape. However, as mentioned above as to the material of the copper system powder, it is necessary to prevent the metal powder 64 from attacking the piston ring groove as a opposite material, and in such viewpoint, the polygonal shape is not preferred, and squama shape shown in FIG. 7 may be preferred. By adopting the squama-shaped metal powders and arranging them in the thickness direction of the surface coating film in an overlapped manner as shown in FIG. 7, the piston ring groove can be prevented from being damaged In the case of the metal powder 64 having the squama shape, the size thereof is not specifically limited, but it may be preferred for the metal powder to have an average particle diameter of 8 to 12 μm. In the case of the average particle diameter of less than 8 μm, a cost required for making powder will be increased, and on the other hand, in the case of the average particle diameter of more than 12 μm, the metal powder has a fear of attacking the piston ring groove as the opposite material. Further, it is to be noted that the particle diameter of the metal powder 64 is a length "r" shown in FIG. 7B, which means the length in the longitudinal direction of squama-shaped piece.

Furthermore, in the case where the metal powder 64 has the squama shape, it is preferred for the metal powder 64 to have specific surface area of 0.6 to 0.9 $mm^2/g$. In the case of the specific surface area of less than 0.6 $mm^2/g$, the heat-resistant resin 63 and the metal powder 64 may provide a no good tight performance, that is, the metal powder 64 is not fixed by the heat-resistant resin. On the other hand, in the case of the specific surface area of more than 0.9 $mm^2/g$, the metal powder 64 is too large and may attack the piston ring groove as an opposite material. Further, in the present invention, the term of the specific surface area means a surface area per 1 gram (1 g) of metal powder, which is a value measured by air permeability method.

With the surface coating film 62 constituting the piston ring of the present invention, containing rate of the metal powders 64 with respect to the heat-resistant resin 63 may be set at a balance of an extent that the heat-resistant resin 63 can achieve the lubricating ability, and the metal powders 64 can sufficiently achieve the wear resistance. More specifically, it may be desired to set the containing rate of the metal powders 64 with respect to the entire surface coating film 62 to 20 to 80 mass percent (%), and more preferably, to about 50 mass %. In the case of less than 20 mass % of the metal powders 64, the reduction or vanishing of the surface coating film due to wear cannot be sufficiently prevented and aluminium adhesion cannot be prevented enough, and on the other hand, in the case of more than 80 mass %, flexibility of the surface coating film is entirely lowered, and it becomes difficult to fix the metal powders 64 with the heat-resistant resin 63, which may result in separation of the metal powders 67. Further, the heat-resistant resin 63 may be added with a fine amount of solid lubricant in consideration of conformability.

Further, it is preferred that an area ratio (see FIG. 7B), which is occupied by the metal powders 64 constituting the piston ring according to the present invention, is in a range of 6 to 74%. In such area ratio of the metal powders 64, the heat-resistant resin 63 and the metal powder 64 can maintain good balance and achieve their advantageous effects sufficiently.

Furthermore, it is preferred to contain the solid lubricant 66 in the heat-resistant resin 63 and it is preferred to disperse uniformly. One or more than one lubricant may be selected as such solid lubricant 66 from molybdenum disulfide, tungsten disulfide or graphite. As mentioned, by adding the solid lubricant, the initial running-in of the aluminium adhesion can be improved. As the specific containing amount, it may be preferred that the containing amount of the solid lubricant 66 with respect to the entire surface coating film 62 is set to 2 to 10 mass % (in this case, when the containing amount of the metal powder 64 formed of predetermined material is 20 to 80 mass %, the residual is heat-resistant resin 63). By forming the surface coating film in which the solid lubricant is contained in addition to the metal powder formed of the predetermined material onto the upper and lower surfaces of the piston ring, the initial conformability and the heat-resistant performance to the piston material formed of the aluminium can be improved, and as a result, the aluminium adhesion can be prevented, thus providing a piston ring excellent in durability.

Further, as the solid lubricant, tungsten selenide, molybdenum selenide, boron nitride, fluororesin (polytetrafluoroetylene) or like may be used to obtain substantially the same effects as mentioned above.

The surface coating film forming method according to the present invention is not specifically limited, and for example, the metal powder 64 of the type mentioned above is contained in the polyamideimide resin as the heat-resistant resin, which is then coated on the surface of the piston ring body 61 by a spray coating method, dip coating method, electrostatic coating method or like. Furthermore, the surface coating film 62 may be subjected to after-treatment such as heated-baking process as occasion demands.

It is desirable that the surface coating film the thus formed has a thickness of, for example, 3 to 20 μm.

EXAMPLE

The present invention will be further specifically described with reference to Examples of the piston ring of the present invention and Comparative Examples.

Examples 1-48 and Comparative Examples 1-6

A member corresponding to the piston ring body was prepared by using a material corresponding to JIS SWOSC-V. The piston ring has the following dimensions of outer diameter: 71 mm, width in ring diameter direction (a1): 2.55 mm, width in ring axis direction (h1): 1.2 mm, and the JIS SWOSC-V material has composition of C: 0.55 mass %, Si: 1.4 mass %, Mn: 0.6 mass %, P: 0.02 mass %, S: 0.02 mass %, Cr: 0.65 mass %, Cu: 0.08 mass %, and residual: F and unavoidable impurity.

Copper (Cu) system powders as metal powder particles and molybdenum disulfide as solid lubricant were contained in polyamideimide resin as heat-resistant resin, and this material was sprayed on both the upper and lower surfaces of the member mentioned above so as to form a surface coating film having thickness of 10 μm. The added amounts of the copper system powder and the molybdenum disulfide are shown in the following Table 1. Further, a chemical conversion treatment by manganese group phosphate as base film was performed so as to form a phosphate coating film 65 on a surface on which the surface coating film of the piston ring body is formed, and then, the thickness and the surface roughness of the phosphate coating film 65 were measured.

The thus formed piston ring test pieces were prepared as Examples 1-48 and Comparative Examples 1-6, and by using these examples, peeling (i.e., cross-cut) test was executed.

Figure 8:
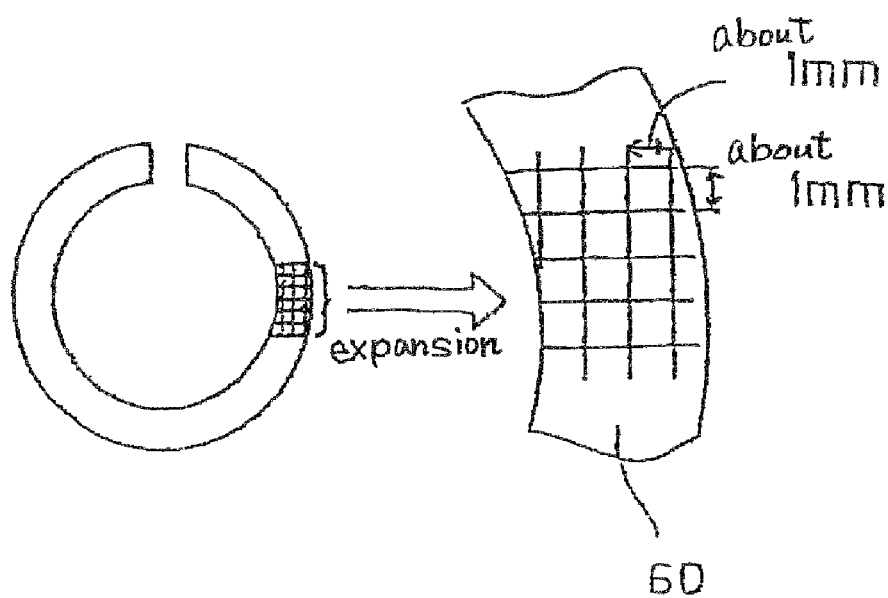
FIG. 8 is an illustration explaining a peel-off evaluation test result.

These tests are cross-cut tests based on JIS K 5400, and as shown in FIG. 8, notches, each having a depth penetrating the surface coating film, were formed by using a cutter at an interval of about 1 mm at optional positions of piston ring test pieces so as to form square-cross shape. Thereafter, adhesion tape was bonded, and then, peeled off to confirm and evaluate the tight performance of the surface coating film on the basis of widened largeness or size of damages from the notches.

In these cross-cut adhesion tests, a case in which a slight peeling is observed at an intersecting point of the cut damages, each square-cross shape has no peeling, and an area of a peel-off portion is less than 1% of the entire square-cross shape area was evaluated as "⊚", a case in which a peeling is observed at an intersecting point of the cut damages, and an area of a peel-off portion is in a range of 1-3% of the entire square-cross shape area was evaluated as "○", a case in which a peeling is observed at an intersecting point of the cut damages, and an area of a peel-off portion is in a range of 3-5% of the entire square-cross shape area was evaluated as "Δ", and a case in which a peeling is observed at an intersecting point of the cut damages and an area of a peel-off portion is not less than 5% of the entire square-cross shape area was evaluated as "X".

These test results and evaluations are shown in the following Table 1.

TABLE 1

|  | Phosphate coating film | | Surface coating film | | |
|---|---|---|---|---|---|
|  | Film thickness (μm) | Surface roughness Rz (μm) | Containing amount of wear-resistance metal (mass %) Copper group powder | Containing amount of solid lubricant (mass %) Molybdenum disulfide | Peeling test Evaluation |
| Example 1 | 3 | 0.5 | 20 | 2 | Δ |
| Example 2 | 3 | 2 | 20 | 2 | ○ |
| Example 3 | 3 | 4 | 20 | 2 | ⊙ |
| Example 4 | 3 | 6 | 20 | 2 | ⊙ |
| Example 5 | 3 | 10 | 20 | 2 | ○ |
| Example 6 | 3 | 11 | 20 | 2 | Δ |
| Example 7 | 3 | 0.5 | 20 | 10 | Δ |
| Example 8 | 3 | 2 | 20 | 10 | ○ |
| Example 9 | 3 | 4 | 20 | 10 | ⊙ |
| Example 10 | 3 | 6 | 20 | 10 | ⊙ |
| Example 11 | 3 | 10 | 20 | 10 | ○ |
| Example 12 | 3 | 11 | 20 | 10 | Δ |
| Example 13 | 5 | 0.5 | 20 | 2 | Δ |
| Example 14 | 5 | 2 | 20 | 2 | ○ |
| Example 15 | 5 | 4 | 20 | 2 | ⊙ |
| Example 16 | 5 | 6 | 20 | 2 | ⊙ |
| Example 17 | 5 | 10 | 20 | 2 | ○ |
| Example 18 | 5 | 11 | 20 | 2 | Δ |
| Example 19 | 5 | 0.5 | 20 | 10 | Δ |
| Example 20 | 5 | 2 | 20 | 10 | ○ |
| Example 21 | 5 | 4 | 20 | 10 | ⊙ |
| Example 22 | 5 | 6 | 20 | 10 | ⊙ |
| Example 23 | 5 | 10 | 20 | 10 | ○ |
| Example 24 | 5 | 11 | 20 | 10 | Δ |
| Example 25 | 8 | 0.5 | 80 | 2 | Δ |
| Example 26 | 8 | 2 | 80 | 2 | ○ |
| Example 27 | 8 | 4 | 80 | 2 | ⊙ |
| Example 28 | 8 | 6 | 80 | 2 | ⊙ |
| Example 29 | 8 | 10 | 80 | 2 | ○ |
| Example 30 | 8 | 11 | 80 | 2 | Δ |
| Example 31 | 8 | 0.5 | 80 | 10 | Δ |
| Example 32 | 8 | 2 | 80 | 10 | ○ |
| Example 33 | 8 | 4 | 80 | 10 | ⊙ |
| Example 34 | 8 | 6 | 80 | 10 | ⊙ |
| Example 35 | 8 | 10 | 80 | 10 | ○ |
| Example 36 | 8 | 11 | 80 | 10 | Δ |
| Example 37 | 10 | 0.5 | 50 | 2 | Δ |
| Example 38 | 10 | 2 | 50 | 2 | ○ |
| Example 39 | 10 | 4 | 50 | 2 | ⊙ |
| Example 40 | 10 | 6 | 50 | 2 | ⊙ |
| Example 41 | 10 | 10 | 50 | 2 | ○ |
| Example 42 | 10 | 11 | 50 | 2 | Δ |
| Example 43 | 10 | 0.5 | 50 | 10 | Δ |
| Example 44 | 10 | 2 | 50 | 10 | ○ |
| Example 45 | 10 | 4 | 50 | 10 | ⊙ |
| Example 46 | 10 | 6 | 50 | 10 | ⊙ |
| Example 47 | 10 | 10 | 50 | 10 | ○ |
| Example 48 | 10 | 11 | 50 | 10 | Δ |
| Comparative Example 1 | 0 | — | 20 | 2 | X |
| Comparative Example 2 | 0 | — | 50 | 2 | X |
| Comparative Example 3 | 0 | — | 80 | 2 | X |
| Comparative Example 4 | 0 | — | 20 | 10 | X |
| Comparative Example 5 | 0 | — | 50 | 10 | X |
| Comparative Example 6 | 0 | — | 80 | 10 | X |

As can be apparent from the comparison of the Examples 1-48 with the Comparative Examples 1-6, substantially no peeling of the surface coating film was observed to the test pieces of the piston rings according to the present invention in which the chemical conversion treatment by the phosphate was executed to form the phosphate coating film 65 in comparison with the Comparative Examples in which the phosphate coating film 65 was not formed. In addition, in the tests of the Examples of the present invention, the area of the damaged portion is less than 5% of the entire square-cross shape area, and thus, good peeling prevention effect could be confirmed. Specifically, in the case in which the degree of surface roughness was made in a range 1-10 μm, the area of the damaged portions was less than 3% of the entire square-cross shape area, thus providing a good peeling prevention effect.

It is further to be noted that the present invention is not limited to the described embodiment and many other changes and modifications may be made without departing from the scopes of the appended claims.

What is claimed is:

1. A piston ring including a piston ring body and a surface coating film formed on at least one of upper and lower surfaces of the piston ring body, wherein the surface coating film comprises a heat-resistant resin and a metal powder contained in the heat-resistant resin, and a phosphate coating film is formed, as base coating film of the surface coating film, on a surface on which the surface coating film of the piston ring body is formed, wherein the metal powder is either one of pure copper, copper oxide or copper alloy, and containing rate of the metal powder in the entire surface coating film is in a range of 20 to 80 mass %, wherein the heat-resistant resin includes a solid lubricant having containing rate of 2 to 10 mass % in the entire surface coating film, wherein the solid lubricant is one or more than one of molybdenum disulfide, tungsten disulfide or graphite, wherein the metal powder has a squama shape, and wherein a ratio of an area of a surface of the piston ring which is occupied by the metal powder to a total area of the surface on which the surface coating film of the piston ring body is formed is in a range of 6 to 74%, wherein the phosphate coating film has a thickness of 1 to 10 µm, and wherein the metal powder has an average particle diameter of 8 to 12 µm.

2. The piston ring according to claim 1, wherein the phosphate coating film is a coating film of a material selected from a group consisting of tribasic zinc phosphate system, phosphoric acid manganese system, and tribasic zinc phosphate calcium system.

3. The piston ring according to claim 1, wherein the phosphate coating film has a surface roughness of 1 to 10 µm in ten-point average roughness Rz.

4. The piston ring according to claim 1, wherein the heat-resistant resin is polyamideimide resin or polyimide resin.

* * * * *